(12) United States Patent
Hoff

(10) Patent No.: US 11,117,417 B2
(45) Date of Patent: Sep. 14, 2021

(54) METHOD FOR PRODUCING DECORATIVE PANELS

(71) Applicant: Akzenta Paneele + Profile GMBH, Kaisersesch (DE)

(72) Inventor: Egon Hoff, Mastershausen (DE)

(73) Assignee: Akzenta Pancele + Profile GMBH, Kaisersesch (DE)

( * ) Notice: Subject to any disclaimer, the term of this patent is extended or adjusted under 35 U.S.C. 154(b) by 144 days.

(21) Appl. No.: 16/426,140

(22) Filed: May 30, 2019

(65) Prior Publication Data
US 2019/0344607 A1 Nov. 14, 2019

Related U.S. Application Data

(62) Division of application No. 15/120,544, filed as application No. PCT/EP2015/053610 on Feb. 20, 2015, now Pat. No. 10,350,938.

(30) Foreign Application Priority Data

Feb. 25, 2014 (EP) .................................... 14156483

(51) Int. Cl.
*B32B 3/10* (2006.01)
*B44C 5/04* (2006.01)
(Continued)

(52) U.S. Cl.
CPC .............. *B44C 5/04* (2013.01); *B32B 21/06* (2013.01); *B44C 1/24* (2013.01); *B44C 5/043* (2013.01);
(Continued)

(58) Field of Classification Search
None
See application file for complete search history.

(56) References Cited

U.S. PATENT DOCUMENTS

| 2,993,523 A | | 7/1961 | Monaco |
| 5,529,812 A | * | 6/1996 | Keding ................. B05D 3/068 427/496 |

(Continued)

FOREIGN PATENT DOCUMENTS

| CN | 86105159 A | 2/1987 |
| DE | 2113763 A1 | 9/1972 |

(Continued)

OTHER PUBLICATIONS

Herman Van Dyk, Determination of Wood Panel Uniformity by Means of Optical Sensor Technology, 2010 (Year: 2010).

*Primary Examiner* — Christopher M Polley
(74) *Attorney, Agent, or Firm* — Harness, Dickey & Pierce, P.L.C

(57) ABSTRACT

The present disclosure relates to a method for producing a decorative panel. The method comprises the following method steps in order to generate an especially realistic perceptive impression of a structuring, even with a lacquer-containing top layer: a) providing a carrier, b) applying a decoration onto at least a partial region of the carrier, c) applying a lacquer-containing top layer onto the decoration, wherein the method is characterized in that d) the lacquer-containing top layer is partially hardened, wherein d1) a partial hardening of the top layer is realized while forming a hardening gradient and wherein the hardening gradient is established in the direction of the thickness of the top layer such that a surface region of the top layer is hardened comparably stronger than a deeper-lying region of the top layer, and wherein e) subsequent to the only partial hardening of the top layer the latter it is provided with a structuring, wherein f) method step e) is realized at least partially by a negative structuring, and g) the lacquer- (Continued)

containing top layer is final hardened after method step e). The invention further relates to a decorative panel.

3 Claims, 1 Drawing Sheet

(51) Int. Cl.
  *B44C 1/24* (2006.01)
  *B32B 21/06* (2006.01)
  *B44C 5/06* (2006.01)
(52) U.S. Cl.
  CPC ............ *B44C 5/06* (2013.01); *B32B 2419/04* (2013.01); *B32B 2471/00* (2013.01); *B32B 2607/02* (2013.01); *Y10T 428/24802* (2015.01)

(56) References Cited

U.S. PATENT DOCUMENTS

| | | | |
|---|---|---|---|
| 6,569,272 | B2 | 5/2003 | Tychsen |
| 8,110,132 | B2 | 2/2012 | Kimberly |
| 8,465,804 | B2 | 6/2013 | Provoost et al. |
| 2003/0138618 | A1 | 7/2003 | Courtoy et al. |
| 2003/0207083 | A1* | 11/2003 | Hansson ............... B44D 3/003 428/143 |
| 2004/0094262 | A1 | 5/2004 | Canti |
| 2006/0230358 | A1 | 10/2006 | Sacher et al. |
| 2007/0175912 | A1 | 8/2007 | Uehara et al. |
| 2008/0311299 | A1 | 12/2008 | Furukawa |
| 2009/0145066 | A1 | 6/2009 | Pervan et al. |
| 2009/0202810 | A1 | 8/2009 | Kimberly |
| 2010/0055420 | A1 | 3/2010 | Vermeulen |
| 2010/0098963 | A1* | 4/2010 | Dohring ................... B05C 1/14 428/537.1 |
| 2012/0183784 | A1 | 7/2012 | Russell |
| 2016/0016744 | A1 | 1/2016 | Turke et al. |
| 2016/0136913 | A1 | 5/2016 | Hannig |

FOREIGN PATENT DOCUMENTS

| | | |
|---|---|---|
| DE | 19842510 A1 | 3/2000 |
| DE | 10205894 A1 | 8/2003 |
| EP | 1153747 A2 | 11/2001 |
| EP | 1842661 A1 | 10/2007 |
| EP | 1905600 A2 | 4/2008 |
| EP | 2402174 A1 | 1/2012 |
| EP | 2857221 A1 | 4/2015 |
| GB | 2324982 A | 11/1998 |
| JP | H04235158 A | 8/1992 |
| JP | H09-216209 A | 8/1997 |
| JP | H09290409 A | 11/1997 |
| JP | H10-166321 A | 6/1998 |
| JP | H11-333983 A | 12/1999 |
| JP | 2001246606 A | 9/2001 |
| JP | 2009154037 A | 7/2009 |
| JP | 2010-162784 A | 7/2010 |
| JP | 2011522138 A | 7/2011 |
| WO | 2001/48333 A1 | 7/2001 |
| WO | 2002/28665 A1 | 4/2002 |
| WO | 2002/076697 A1 | 10/2002 |
| WO | 2002/094523 A1 | 11/2002 |
| WO | 2007/061193 A1 | 5/2007 |
| WO | 2008/061791 A1 | 5/2008 |
| WO | 2008122668 A1 | 10/2008 |
| WO | 2009/065769 A2 | 5/2009 |
| WO | 2015/011049 A1 | 1/2015 |

* cited by examiner

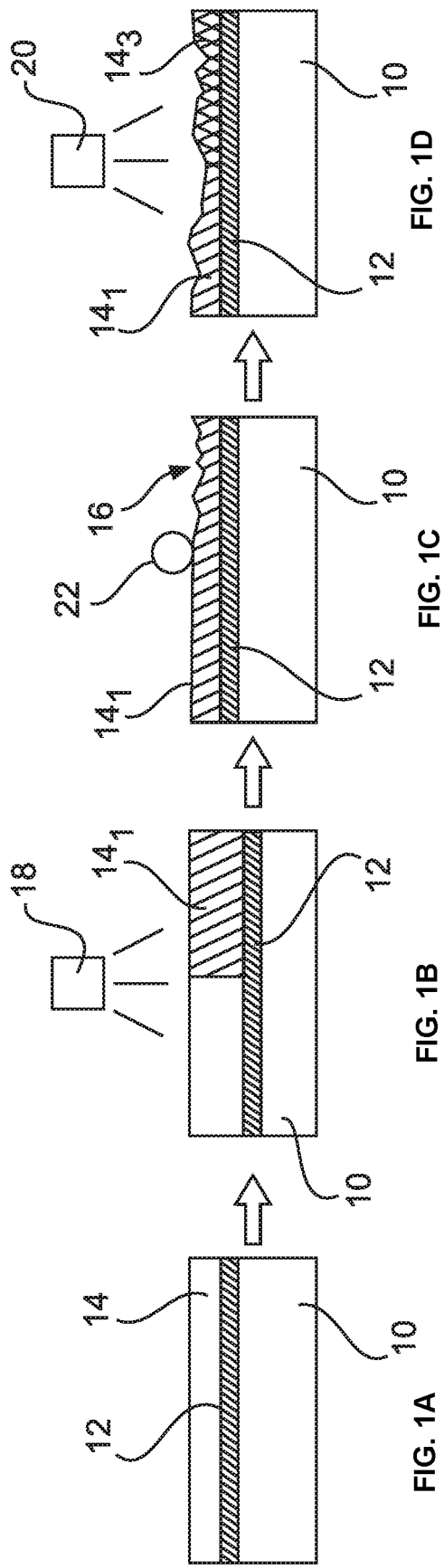
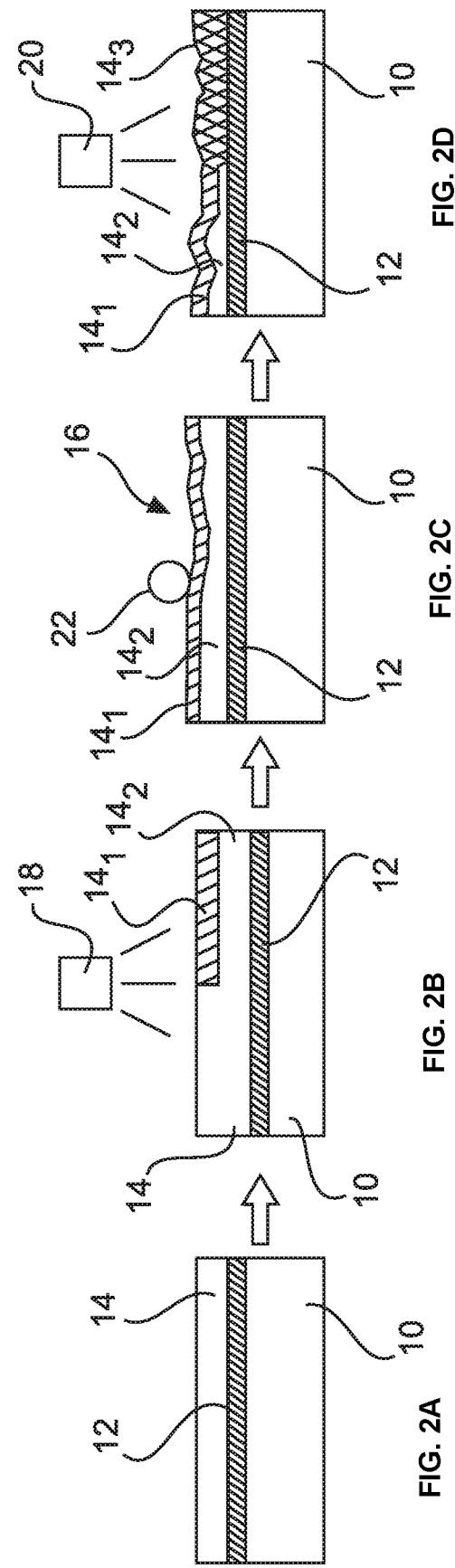

METHOD FOR PRODUCING DECORATIVE PANELS

CROSS-REFERENCE TO RELATED APPLICATIONS

This application is a divisional of U.S. patent application Ser. No. 15/120,544, filed on Aug. 22, 2016 which is a National Stage of International Application No. PCT/EP2015/053610, filed on Feb. 20, 2015, and published in German as WO 2015/128255 A1 on Sep. 3, 2015. This application claims the priority to European Patent Application No. 14156483.1, filed on Feb. 25, 2014. The entire disclosures of the above applications are incorporated herein by reference.

FIELD

The present disclosure relates to a method for producing decorative panels. The present disclosure in particular relates to a method for improved patterning of a lacquer-containing top layer of a decorative panel in the course of the production of decorative panels. The present disclosure further relates to a decorative panel.

BACKGROUND

This section provides background information related to the present disclosure which is not necessarily prior art.

The term decorative panel in the sense of the disclosure means wall, ceiling, door or floor panels comprising a decoration applied onto a carrier plate. Decorative panels are used in a variety of ways both in the field of interior design of rooms and for decorative cladding of buildings, for example in exhibition stand construction. One of the most common application fields of decorative panels is their use as a floor covering, for cladding ceilings, walls or doors. Herein, the decorative panels often comprise a decoration and a surface structure intended to replicate a natural material.

Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Heretofore, such decorative panels have often been produced as laminates in which a decorative paper preprinted with a desired decoration is applied onto a carrier plate and in turn a so-called overlay is applied onto the decorative paper. After optionally a backing paper has been applied to the side of the carrier plate opposite to the decorative paper the laminate structure obtained is fixedly bonded together by use of appropriate pressure and/or heat-activated adhesives.

For protecting the applied decorative layer normally wearing or top layers are applied on top of the decorative layer. It is often provided that in such wearing or top layers a surface structure imitating a decorative template is introduced such that the surface of the decorative panel has a haptically perceivable structure which with respect to its shape and pattern corresponds to the applied decoration in order to achieve a reproduction of a natural material as close to the original as possible even with respect to the haptic.

In forming the top layer with varnishes or lacquers, respectively, the structure in this case is introduced by so-called positive patterning in which the structures are built up by applying a lacquer layer and in particular by selective application of the raised areas of the structure. This is often achieved by negatively structured embossing means adapted to apply the paint layer correspondingly. A disadvantage of such a process may be that in particular large-scale areas can be applied, however, the formation of small and locally restricted areas, such as pores, is very difficult. As a result a highly realistic impression of the structure by positive patterning of lacquers is often possible only to a limited extend. However, negative structuring of paint-containing layers with sufficient quality was previously not possible.

From WO 01/48333 A1 a method for producing surfaces with a decorative upper side for example for use as a floor covering is known. Here, a decorative layer is applied onto a printed surface wherein the top layer can be applied as a plurality of laminate layers which after the application and prior to the application of the respective next laminate layer is partially hardened.

The documents WO 02/28665 A1, U.S. Pat. No. 5,529,812 A and EP 2402174 A1 respectively describe the production of decorative elements in which a top layer is applied and is at first partially hardened.

SUMMARY

This section provides a general summary of the disclosure, and is not a comprehensive disclosure of its full scope or all of its features.

Taken this into account it is the object of the present disclosure to provide a method for producing a decorative panel which is adapted to overcome at least partially the problems known from the prior art.

The present disclosure proposes a method for producing a decorative panel, comprising the steps of:
a) providing a carrier,
b) applying a decoration onto at least a partial region of the carrier,
c) applying a lacquer-containing top layer onto the decoration,
characterized in that
d) the lacquer-containing layer is partially hardened; wherein
d1) the partial hardening of the top layer is realized by forming a hardening gradient, wherein the hardening gradient is formed in the thickness direction of the top layer such that a surface region of the decorative layer is hardened more than a deeper-lying region of the top layer; and wherein
e) subsequently to the partially hardening of the top layer it is provided with a structure, wherein
f) process step e) is at least partially carried out by negative patterning; and
g) the lacquer-containing top layer is finally hardened after process step e).

It has surprisingly been found that when the lacquer-containing top layer is partially hardened prior to patterning and is provided with a structure subsequently to such a partially hardening before a final hardening takes place, a negative patterning of the lacquer-containing top layer and thus a particularly detailed structure or a particularly detailed perception of the applied structure is enabled. In particular, in this way it is enabled to perform a negative patterning on a lacquer layer, i.e. in particular to introduce locally limited depressions in the structure, such as imitated pores, for example by means of an embossing means, which can significantly improve the perceptive impression of the structure.

For this purpose, the method according to process step a) initially comprises the provision of an in particular plate-shaped carrier. Herein, the material of the carrier in particular may be selected depending on the desired field of application. Thus, the carrier may for example comprise or consist of a wood-based material as long as the decorative panel is not exposed to excessive moisture or weather conditions. If, however, the panel should be used for example in wet rooms or outdoors, the carrier may for example consist of or comprise a plastic material.

Wood-based materials in the sense of the disclosure in addition to solid wood materials are materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC) sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

Plastic materials which can be used for producing corresponding panels or carriers are, for example, thermoplastic plastic materials such as polyvinyl chloride (PVC), polyolefines (such as polyethylene (PE), polypropylene (PP)), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), aluminum oxide, silicagel, quartz powder, wood flour, gypsum. In addition they can be coloured in a known way.

Such a carrier may substantially be a carrier as is basically known to a person skilled in the art from prior art.

In a further process step the above described method according to process step b) comprises applying a decoration which is to replicate or imitate, for example, a decorative template on at least a partial region of the carrier. In this process step, thus, at least a partial region of the carrier, in particular the complete carrier, is provided with such a decoration.

A "decorative template" in the sense of the present disclosure in particular means such an original natural material or at least a surface of such a material which is to be imitated or replicated by the decoration.

The application of the decoration may, for example, be realized by applying the decoration directly onto the carrier, for example by a printing process. Herein, further a suitable print base may be provided on the carrier. Alternatively, it is not excluded according to the present disclosure that the decoration is applied such that, for example, an already printed fiber layer, such as a paper layer, or a preprinted film, such as of polyethylene, polypropylene or polyvinyl chloride is applied onto the carrier.

In the sense of the disclosure the term fiber materials means materials such as paper and non-woven fabrics on the basis of plant, animal, mineral or even synthetic fibers as well as cardboards. Examples of fiber materials on the basis of plant fibers in addition to papers and non-woven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

According to the further process step c) subsequently a paint-containing top layer is applied onto the decoration.

A top layer, also designated as a wearing layer, in the sense of the disclosure in particular is a layer applied as an outer border which in particular protects the decorative layer from wear or damage caused by dirt, moisture or mechanical impacts such as abrasion. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof, in order to increase the wear resistance of the layer. Herein, it may be provided that the hard material is included in the wearing layer composition in an amount between 5 wt.-% and 40 wt.-%, preferably between 15 wt.-% and 25 wt.-%. Herein, the hard material preferably has a mean grain diameter between 10 µm and 250 µm, more preferably between 10 µm and 100 µm. In this way in a preferable way it is achieved that the wearing layer composition forms a stable dispersion and a decomposition or precipitation of the hard material within the wearing layer composition can be avoided. For forming a corresponding wearing layer in one embodiment of the disclosure it is provided that the composition including the hard material is applied at a concentration between 10 g/m$^2$ and 250 g/m$^2$, preferably between 25 g/m$^2$ and 100 g/m$^2$. The application of the top layer may be implemented, for example, by means of rollers such as rubber rollers, or by means of pouring devices. In a further embodiment of the disclosure it may be provided that the hard material is not contained in the composition at the time of the application of the wearing layer composition, but is scattered as particles onto the wearing layer composition, and this subsequently is hardened.

In this case it is further provided that the top layer contains a paint. A paint-containing top layer in the sense of the present disclosure in particular means a top layer that contains in particular radiation curable components. Herein, lacquers may be understood in particular as substances that can be hardened by UV radiation.

The advantage of a lacquer-containing top layer can in particular be seen in the fact that it may be particularly stable, while it releases very low quantities of emissions, such as odor emissions, during the processing.

In a method described above it is further provided that in a further process step d) the lacquer-containing top layer is partially hardened. This process step of only partially hardening the top layer enables to prepare the top layer particularly advantageous for negative patterning as will be described in detail below.

Subsequently to the above described partial hardening the top layer is provided with a structure in process step e), wherein this step according to process step f) at least partially is carried out by negative patterning. Thus, in this step the top layer is provided with a structure which may correspond, for example, to a decorative template or ideally can replicate it template identical. Alternatively, usual structures can be introduced for such a decoration which need not necessarily be formed template identical but can imitate such a decoration or a respective decorative template. Herein, for example, pores of a wood imitation and/or other surface structures can be introduced into the top layer. This process step is carried out by so-called negative patterning. Negative patterning in the sense of the present disclosure means in particular that not, as is usual in lacquer systems according to the prior art, raised areas are applied in a defined manner on a base surface, but to the contrary depressions are impressed. This may for example be realized by an embossing tool which for example can be embodied as an embossing roller. The embossing roller, for example, may be formed of a metal at least on the embossing surface and may for example be a steel roller or may be formed of a plastic material at least on the embossing surface. The plastic material may be in particular a hard plastic, wherein a hard plastic in the sense of the present disclosure in particular may be a plastic material having a hardness in the range of ≥80 Shore, for example ≥100 Shore, measured according to DIN EN ISO 868.

It may be provided that the patterning of the top layer is implemented completely by a negative process, however, in the context of the disclosure it is not excluded that parts of the top layer are patterned by positive patterning, i.e. raised portions can be applied in a defined manner.

In particular, it is preferred that the application of the structure or the embossing of the structure is carried out in accordance with the applied decoration of the carrier plate in order to obtain a replicate of a natural material as close to the original as possible. Herein, it may be provided that the patterning of the top layer is implemented by means of suitable optical methods and an alignment of the embossing tool and the carrier plate with respect to each other is done depending on the detected decoration. Herein, for aligning the embossing means and the carrier plate relative to each other it can be provided that a relative movement between the embossing tool and the carrier plate necessary for the alignment is implemented by a displacement of the carrier plate or by a displacement of the embossing tool.

Due to the fact that prior to the introduction of the structure the lacquer-containing top layer is not completely, but only partially hardened, the top layer may be pretreated such that an embossing means can emboss the corresponding structure into the top layer and the structure, moreover, after its introduction may retain its shape at least until a complete hardening. Thus, the disadvantage of the treatment of a lacquer-containing layer of the prior art can be overcome, according to which a negative embossing has not been possible. A basic objective of partial hardening for example the entire top layer or only a defined portion thereof, herein in particular is to treat the top layer such that a sufficient stability for a durable structure even after removal of the embossing means from the top layer is obtained. Furthermore, however, a sufficient flexibility of the top layer should be provided in order to be able to introduce a structure into the top layer by the embossing means without any problems. Surprisingly, it has been found that the foregoing can be enabled in particular by carrying out a partial hardening of the top layer.

Subsequently to the introduction of the structure into the top layer this may then be finally hardened or fully hardened in accordance with process step g).

In summary, by the method described above it is thus made possible to produce a structure of the lacquer-containing top layer by negative patterning by means of which the perceptive impression of the decorated panel is particularly close to the original or to the decorative template. In other words, by means of the method described above particularly high-quality decorative panels can be produced.

Herein, a partially hardening of the top layer is in particular realized by forming a hardening gradient. This in the context of the present disclosure in particular means that regions are present in the top layer which may be partially hardened and thereby have a relatively low hardening degree or which may also be fully unhardened, and that further regions are present in the top layer which are partially hardened and have a relative higher hardening degree, wherein the respective regions are locally restricted, i.e. are present with a hardening gradient or a spatial hardening gradient. In this case, in particular the combination of comparatively less hardened or unhardened regions and comparatively more hardened regions and thus of comparatively flexible and comparatively stable regions in the top layer may enable in a particularly advantageous manner a combination of flexible and stable regions and thereby a negative patterning of the paint-containing top layer.

Herein, it is in particular provided that a hardening gradient is realized in the thickness direction of the top layer. In this embodiment, thus, in other word in particular the surface or a surface region of the top layer may be hardened more, wherein deeper-lying regions of the top layer compared to the regions of the surface of the top layer are less hardened. For example, a hardening can take place at the surface of the top layer and thereby in a spatial region which is approximately in a range of ≤50% with respect to the total thickness of the applied top layer, for example in a range from ≥20% to ≤40% with respect to the total thickness of the applied top layer. For example, the upper third or the upper 33% of the top layer have a higher hardening degree than the remaining region of the top layer. In this configuration, therefore, for example, the surface can be quasi gelled, wherein deeper-lying regions of the top layer are only slightly hardened. Thus, it is enabled that by means of the relative flexible regions in the interior of the top layer an embossing means can readily penetrate into the top layer and thus can emboss a structure, however, by the relatively more hardened regions at the surface of the top layer a sufficient stability can be provided, such that the structure after removal of the embossing means can remain unaltered at least up to a complete final hardening of the top layer. Thus, in particular a little time consuming hardening can be realized, so that a production method for a decorative panel in this embodiment can be implemented particularly economically. Herein, such a hardening may be sufficient to enable a negative patterning without any problems.

In a preferred embodiment of the method described above a partial hardening of the lacquer-containing top layer can be carried out by use of a radiation source or with a power of the radiation source in a range of ≤80 W, for example in a range from ≥5 W to ≤50 W, particularly preferably ≥30 W to ≤40 W. Alternatively or additionally it can be provided that a partial hardening of the lacquer-containing or radiation curable top layer is carried out by use of radiation having a wavelength in a range from ≥200 nm to ≤380 nm, for example in a range from ≥240 nm to ≤280 nm, for example, at 254 nm. Herein, as a radiation source for example a low-pressure lamp or shortwave emitters, such as a gallium emitters, can be used.

In particular, the generation or use of radiation in the above-mentioned power range and/or use of an above described wavelength in the UV wavelength range can enable the generation of a partial hardening and thus enable the generation of a hardening gradient in a particularly advantageous manner. Here, the aforementioned power values are in contrast to the values known in the prior art, where in particular radiation in the longwave band or a high radiation power of usually more than 80 W, for example up to 200 W is used. In contrast to the radiation parameters known from the prior art in a surprising manner in particular in this embodiment it is enabled in a particularly simple manner that the radiation used for example does not penetrate the full thickness of the top layer and thus brings about a complete hardening, but rather in an adjustable and definable way, for example, only a defined surface region of the top layer is subjected to hardening, or that the entire top layer is only partially but not yet fully hardened. Thus, in particular by use of radiation while employing the above parameters a desired radiation gradient can be set in a particularly reliable and defined way.

For example, by use of a wavelength in the above described range, such as less than 300 nm, for example, at 254 nm, a surface region of a thickness of 3 to 4 µm can be hardened. Thus, when the top layer has such a thickness the entire top layer can be partially hardened. This without any restriction may be the case for an application of the top layer in an amount of 30-40 g/m². If larger quantities of the top layer are applied, for example if the surface of the decoration is too uneven, the region of the top layer disposed below the above described thickness range can remain untreated by the radiation of the above described wavelength. Then it may be advantageous to partially harden the entire top layer prior to the treatment of the surface of the top layer, for example by use of a wavelength in a range of 340-360 nm and then to harden the surface of the top layer more intense by a wavelength in the above described range, such as less than 300 nm, for example at 254 nm. Thus, also a two-stage partial hardening of the top layer can be advantageous. In principle, the thickness of the relatively more hardened surface region may depend on the selected parameters, such as in particular the wavelength of the radiation used and the power of the radiation source.

In a further embodiment of the method described above the distance of the radiation source to the surface of the top layer to be patterned can be variable. Herein, it may be provided, for example, that in particular the distance of the radiation source to the surface of the top layer is variable or the radiation source correspondingly can be moved away from the top layer or towards the top layer respectively. In particular in this embodiment the method may be particularly adaptable, because by use of one radiation source for example different layer thicknesses of the top layer as well as different materials of the top layer can be treated by varying the distance and, thus, for example a hardening gradient can be adjusted. Thus, in particular in this embodiment it may be possible that a surface region of the top layer being adjustable particularly defined is hardened more than for example other regions of the top layer.

In another embodiment of the method described above the paint-containing top layer can be applied in a thickness in a range between ≥1 µm and ≤5 mm, preferably between ≥1 µm and ≤20 µm. Such thicknesses of the top layer may already be sufficient to introduce a highly realistic surface structure while still enabling to adjust a hardening gradient set as described above. Even with such thicknesses it can for example be avoided that the top layer is hardened equally over the entire thickness but rather it may be allowed, for example, that a surface region of the top layer is hardened, whereas a deeper-lying region of the top layer is less hardened. Here, the specific thickness to be used has to be adapted in a way known by those skilled in the art, for example, to the structure to be applied or other application specific parameters.

In a further embodiment of the method described above the lacquer-containing top layer can comprise an acrylate-based lacquer. In particular, the top layer may comprise one or more acrylates, which in particular may be modified by polyurethane (PU) or acrylate/polyurethane systems can be used. In particular such lacquer systems can form a particularly scratch- and impact-resistant top layer, which can make the produced decorative panel particularly resistant. Here, it only has been enabled by the present disclosure to provide such paint systems with a negative structure, so as to enable a particularly high-quality structural impression with the benefits of the lacquer layer.

In another embodiment of the method described above, the decoration may be applied by means of a direct printing process. The term "direct printing" in the sense of the disclosure means the application of a decoration directly onto the carrier of a panel or onto an unprinted fiber material layer or film material layer applied to the carrier. In contrast to conventional methods in which a decorative layer previously printed with a desired decoration is applied onto the carrier, in direct printing the decoration is printed directly in the course of the panel manufacturing process. Here, different printing techniques such as flexographic printing, offset printing or screen printing may be used. In particular digital printing techniques such as inkjet processes or laser printing can be used.

For example, a print base for a decoration to be applied by direct printing, in particular digital printing, may be provided on the carrier which may be a so-called primer. Herein a primer can be used which is formed based on an urethane acrylate. Herein, the urethane acrylate may be included in the primer composition in the form of reactive oligomers or prepolymers. The term "reactive oligomer" or "prepolymer" in the sense of the invention is a compound comprising urethane acrylate units which is able to react radiation induced, optionally with addition of a reactive binder or a reactive diluent, to urethane acrylate polymer. Preferably, in the method according to the invention the primer can be applied onto the carrier plate by means of rubber rollers. Preferably, the primer is applied in an amount between ≥1 g/m² and ≤100 g/m², preferably between ≥10 g/m² and ≤50 g/m², in particular between ≥20 g/m² and ≤40 g/m². Subsequently to the application of the primer onto the substrate surface an irradiation by use of a radiation source of an appropriate wavelength is carried out.

Herein, independent from the printing process used it is preferred that the decoration is applied by radiation curable dyes or inks. The term radiation curable dye in the sense of the invention means a binder and/or filler and pigments containing composition which induced by electromagnetic radiation of a suitable wavelength, such as UV radiation, or electron beams can be at least partially polymerized. The term radiation curable ink in the sense of the invention means a substantially filler free color pigments containing composition which induced by electromagnetic radiation of suitable wavelength, such as ultraviolet radiation, or electron beams can be at least partially polymerized.

It may further be provided that in particular upstream of a printing unit of a direct printing process, for example comprising an ink jet printer the carrier to be printed is treated by a device for discharging electrostatic charges. By means of this a particularly accurate printing image is enabled because it can be prevented that the undefined electrostatic charges in the carriers to be printed lead to an undefined deflection of the dye or ink drops on their way from the print head to the surface to be printed in the course of the production process. The device for discharging electrostatic charges can for example be formed by an ionizing blower which directs ionized air over the carrier. Furthermore, it may be provided that the device for discharging electrostatic charges is at least a roller, a brush or a lip made of a conductive material which electrically contacts the carrier at least in the area of the printing unit and which is connected to an electrical ground potential. The electrical ground potential can be provided for example by a grounding.

With regard to further technical features and advantages of the method according to the disclosure it is hereby explicitly referred to the explanations in connection with the decorative panel according to the disclosure, the figures and the figure description.

The present disclosure further relates to a decorative panel comprising an in particular plate-shaped carrier, a decoration and an unstructured lacquer-containing top layer. The decorative panel is characterized in that the unstructured paint-containing top layer is not completely but only partially hardened, wherein the top layer is partially hardened such that a hardening gradient in the thickness direction of the top layer is obtained, and wherein a surface region of the top layer is hardened more than a deeper-lying region of the top layer. By means of partial hardening of the top layer an intermediate stage or a semi-finished product can be manufactured in a particularly advantageous manner, which has particularly advantageous properties with respect to a subsequent patterning process. Thus, the top layer may in particular have sufficient flexibility to allow the penetration of an embossing means such as for example an embossing roller, and simultaneously also may have a sufficient stability to maintain the embossed structure up to a complete hardening. Here, even this intermediate product is already referred to as a decorative panel, since it comprises a carrier which is already provided with a decoration, even if in particular the surface structure and possibly even the size can deviate from that of the final product. Such an intermediate product or an intermediate stage can serve, in particular, to emboss a structure imitating a decorative template into the yet unstructured paint-containing top layer by means of a negative process or negative patterning. This may create a particularly realistic perceptive impression.

Herein, in particular the combination of less hardened or unhardened regions and more hardened regions and thus of relative flexible and relative stable regions in the top layer can enable in a particularly advantageous manner a negative patterning of the paint-containing top layer, as described above with respect to the method.

In a further embodiment of the panel the lacquer-containing top layer can comprise an acrylate-based paint. In particular, the top layer may comprise acrylates, which can in particular be modified by polyurethane, or acrylate/polyurethane systems can be used. In particular such lacquer systems can form a particularly scratch- and impact resistant top layer, which can make the decorative panel to be produced particularly resistant. Here, it has been enabled in the first place by the present disclosure to provide such paint systems with a negative structure, so as to enable a particularly high-quality structural impression with the benefits of the lacquer layer.

In a further embodiment of the panel, the top layer may be at least partially hardened such that a crosslinking degree in a range from ≥50% to ≤90%, for example in a range from ≥65% to ≤85%, particularly preferably in a range from ≥70% to ≤80% is provided. Here, the crosslinking degree may for example be determined by determining the gel content in accordance with DIN ISO 10147. Surprisingly, it has been found that in particular by partially hardening the top layer or at least one, preferably all curable components of the top layer within the abovementioned range, a high flexibility with simultaneously high stability is obtained such that the above described negative patterning is also possible in paint-containing top layers.

Herein, in addition or alternatively to the above described crosslinking degree the partially hardened top layer may be hardened at least partially, such as in a surface region, as described above with reference to a hardening gradient, or even entirely comprise a pendulum hardness or be hardened up to a pendulum hardness in a range from ≥65 to ≤80 seconds. Such pendulum hardnesses can further preferably contribute to enable an advantageous embossing of a defined structure by an embossing means, while an embossed structure remains stable up to a final hardening. Basically the pendulum hardness can be understood as a measure for the surface hardness. Here, a pendulum with hemispherical feet is placed on the paint surface. The pendulum is deflected up to a certain angle and then released. Then the time in seconds is measured that elapses until the pendulum set into oscillation at a first point no longer contacts a second point. The harder a coating is the longer the pendulum oscillates. Herein, the pendulum hardness can in particular be determined by application of DIN ISO 1522 or DIN 53157.

In a further embodiment of the panel the top layer can have a thickness in a range between ≥1 µm and ≤5 mm, preferably between ≥1 µm and ≤20 µm. Here such thicknesses may be particularly advantageous for negative patterning, wherein the specific selected thickness may be in particular be dependent on the actual design.

With regard to further technical features and advantages of the decorative panel according to the disclosure it is explicitly referred to the explanations in connection with the method according to the disclosure, the figures and the figure description.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Hereinafter the disclosure is explained with reference to figures. In the figures:

FIGS. 1A, 1B, 1C and 1D show a schematic process flow of an embodiment of the method according to the disclosure; and FIGS. 2A, 2B, 2C and 2D show a schematic process flow of a further embodiment of the method according to the disclosure.

Corresponding reference numerals indicate corresponding parts throughout the several views of the drawings.

DETAILED DESCRIPTION

Example embodiments will now be described more fully with reference to the accompanying drawings.

FIGS. 1A, 1B, 1C and 1D depict an embodiment of a schematic process flow of a method according to the disclosure. FIG. 1A shows a carrier 10 which is provided with a decoration 12 or a decorative layer and a top layer 14 applied to the decorative layer 12. The top layer may for example have a thickness in a range between ≥1 μm and ≤5 mm, preferably between ≥1 μm and ≤20 μm. The top layer 14 is lacquer-based and may in particular comprise an acrylic lacquer, such as an acrylic/PU system. This assembly is hardened in a process step shown in FIG. 1B by a radiation source 18, wherein the top layer 14 is hardened such that the top layer 14 is partially hardened by forming a partially hardened region $14_1$ which in FIGS. 1A-1D corresponds to the entire top layer 14. Herein a partial hardening of the top layer 14 is realized by forming a hardening gradient and the hardening gradient is formed in the thickness direction of the top layer such that a surface region of the top layer is hardened more than a deeper-lying or deeper region of the top layer.

Herein, certain parameters can be particularly advantageous for a partial hardening. For example, a partial hardening may be implemented by the radiation source 18 with a power in the range of ≤80 W, for example in a range from ≥5 W to ≤50 W, particularly preferably ≥30 W to ≤40 W. Alternatively or additionally, a radiation having a wavelength in a range from ≥200 nm to ≤380 nm, for example in a range from ≥240 nm to ≤280 nm, for example at 254 nm may be used. Accordingly, the radiation source 18 may be a gallium emitter. Subsequently to the partial hardening, the partially hardened region $14_1$, for example, may have a crosslinking degree in the range from ≥50% to ≤90%, for example, ≥65% to ≤85%, particularly preferably in a range from ≥70% to ≤80%, wherein said crosslinking degree can be determined in accordance with DIN ISO 10147. Additionally or alternatively it may be provided that the top layer 14 at least partially has a pendulum hardness in a range from ≥65 to ≤80 seconds, wherein the pendulum hardness can be determined in a known manner according to König or Persoz and thus by application of DIN EN ISO 1522 or DIN 53157.

FIG. 1C further shows that by negative patterning by use of an embossing means 22, such as an embossing roller, a defined structure 16 can be introduced into the partially hardened top layer $14_1$.

FIG. 1D further shows that the top layer 14 can be fully hardened by use of a radiation source 20, for example with a power of 80-100 W, for example a gallium mercury emitter as radiation source 20. Then, the carrier 10 may be separated into panels of a suitable size in the case that the dimensions of the carrier 10 exceed the size of the desired panels.

FIGS. 2A, 2B, 2C and 2D show a further embodiment of the method according to the disclosure, wherein the method mostly corresponds to that described in connection with FIGS. 1A-1D, such that for a detailed description it is referred to the above statements with respect to FIGS. 1A-1D. In the embodiment according to FIGS. 2A-2D, the top layer 14 may be hardened, too, while forming a spatial hardening gradient. This can be seen in FIG. 2B, wherein a partially hardened region $14_1$ of the top layer 14 has been formed at a surface region of the top layer 14 downstream of a radiation source 18 or in the advancing direction past the radiation source 18, whereas in a deeper-lying region of the top layer 14 an unhardened region $14_2$ is present.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A decorative panel comprising a carrier, a decoration and an unstructured lacquer-containing top layer, wherein the unstructured top layer is partially hardened at an intermediate stage such that a crosslinking degree in a range from ≥50% to ≤90% is obtained, wherein the top layer is partially hardened such that a hardening gradient is obtained in the thickness direction of the top layer, and wherein a surface region of the top layer is hardened comparably stronger than a deeper-lying region of the top layer, wherein the surface region of the top layer is structured by embossing when the decorative panel is at the intermediate stage and exhibits stability to maintain the embossed structure until a complete hardening stage is reached, wherein the partially hardened surface region at the intermediate stage imparts a structure imitating a decorative template into the deeper-lying region of the top layer by negative patterning.

2. The decorative panel according to claim 1, wherein the lacquer-containing top layer comprises an acrylate-based lacquer.

3. The decorative panel according to claim 1, wherein the top layer at least partially has a pendulum hardness in a range from ≥65 to ≤80 seconds.

* * * * *